United States Patent Office 3,539,689
Patented Nov. 10, 1970

3,539,689
7-HALO-LINCOMYCIN COMPOSITION AND PROCESS OF TREATMENT
Robert D. Birkenmeyer, Comstock, and Fred Kagan, Kalamazoo, Mich., assignors to The Upjohn Company, Kalamazoo, Mich., a corporation of Delaware
No Drawing. Continuation of application Ser. No. 541,974, Apr. 12, 1966, which is a continuation-in-part of applications Ser. No. 431,184, Feb. 8, 1965, and Ser. No. 498,989, Oct. 20, 1965. This application Feb. 9, 1968, Ser. No. 704,239
Int. Cl. A61k 27/00
U.S. Cl. 424—274      9 Claims

ABSTRACT OF THE DISCLOSURE

Compounds of the formula:

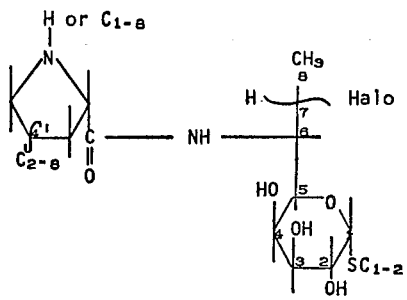

in unit dosage form of 15–500 mg. with pharmaceutical carrier for oral and parenteral administration and process for treating humans and animals hosting microparasites including bacteria, coccidia, and mycoplasma.

CROSS REFERENCES TO RELATED APPLICATIONS

This application is a continuation of application Ser. No. 541,974, filed Apr. 12, 1966, now abandoned which in turn is a continuation-in-part of application Ser. No. 431,184, filed Feb. 8, 1965, now abandoned and application Ser. No. 498,989, filed Oct. 20, 1965, now abandoned.

BRIEF SUMMARY OF INVENTION

This invention relates to 7-halo-lincomycin compounds of the Formula I prepared in unit dosage form of from 15 to 500 mg. in association with a pharmaceutical carrier and a process for treating humans and animals hosting a microparasite susceptible to compounds of the Formula I, said microparasites consisting of gram-positive and gram-negative bacteria, coccidia and mycoplasma.

DETAILED DESCRIPTION

This application relates to novel compositions and processes of treatment and more particularly to compositions comprising, in unit dosage form, a compound of the formula:

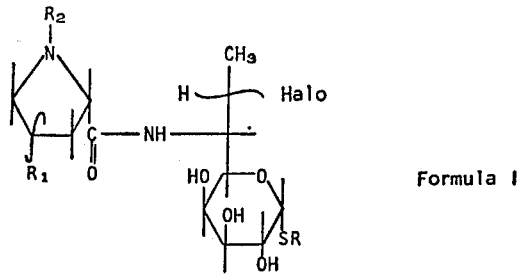

Formula I wherein R is methyl or ethyl, $R_1$ is an alkyl of from 2 to 8 carbon atoms, inclusive, and $R_2$ is hydrogen or alkyl of from 1 to 8 carbon atoms, inclusive, including the free base form and pharmacologically acceptable acid addition salts, in combination with a pharmaceutical carrier.

Examples of alkyl of from 1 to 8 carbon atoms, inclusive, are methyl, ethyl, propyl, butyl, pentyl, hexyl, heptyl, and octyl and isomeric forms thereof.

In the above Formula I, the vertical wavy line ∫ is used to indicate that the group $R_1$ can be in position cis (below the plane of the ring) or trans (above the plane of the ring), with respect to the carbonyl group. The horizontal wavy line ∼ is used to indicate that both epimers are to be included in the group, i.e. the D-erythro configuration and L-threo configuration are intended.

The symbol Halo represents halogen, e.g., chlorine or bromine.

Further, the invention relates to a process for the therapeutic treatment of humans and animals hosting bacterial and other microparasites and the prophylactic treatment of a disease-susceptible host comprising the administration of a compound of the Formula I in the form of the free base or a pharmacologically acceptable acid salt to the host.

The compositions of the present invention are useful in the same manner as lincomycin in the treatment of humals raised for meat can be given prophylactic treatment The compositions provide a means for administering the therapeutic ingredient by the oral and parenteral routes for systemic treatment as well as topica and localized treatment. The compositions provide a method of therapy for tonsillitis, pneumonia, otitis, conjunctivitis, boils, carbuncles and other infectious conditions of humans due to the presence of bacteria. In animals, the compositions can be used prophylactically. For example, rats can be protected from *Streptococcus viridans* during shipment. Animals raised for meat can be given prophylactic treatment for increased weight gain.

Mammals hosting a parasitic protozoan of the class Sporazoa, order Coccidia (a microparasite producing the disease coccidiosis) can be treated by administration of the compositions of the present invention. For example cattle infected with *E. zurnii, E. bovis, E. illipsordalis; sheep and goats with E. parva, E. faurei;* swine with *E. debliecki, E. scabra,* and *Isospora suic;* dogs and cats with *Isospora bigemina, Isospora felis, E. canis, E. felini;* poultry with *E. tenella;* rabbits with *E. steedae, E. perforans*; and mink with *E. mustelae* can be treated.

The compositions are also useful in the treatment of diseases caused by members of the genus Mycoplasma, the most commonly known forms are PPLO (pleuropneumonia-like organisms) such as *M. hominis, M. salivrium, M. mycoides, M. hyopneumonia H. hyorhinis, M. gallisepticum, M. arthriditis* and other species in man and animals, including domestic animals such as sheep, cattle, swine, and poultry (e.g., chickens, turkeys, ducks, and geese) and laboratory animals (e.g., rats and mice).

The compositions find application in the treatment of kidney and other infections when L forms of gram-negative and gram-positive bacteria are present, for example, L forms of *P. mirabilis*.

The compounds of the Formula I have unexpectedly exhibited from 2 to 32 times greater activity against those gram-positive organisms which are inhibited by lincomycin, that is to say, the compounds of the Formula I show a greater inhibition than an equivalent amount (concentration) of lincomycin. Additionally, the compounds of the Formula I show from 2 to 64 times or more inhibition against gram-negative organisms.

The compounds of the Formula I can be prepared by the methods disclosed in copending application Ser. No.

431,184, filed Feb. 8, 1965, and copending application, Ser. No. 498,989, filed Oct. 20, 1965.

PREPARATION OF THE THERAPEUTIC COMPOUNDS

The therapeutic compounds of the invention, Formula I, can be prepared by replacing by halogen, the 7-hydroxy of a compound of the formula

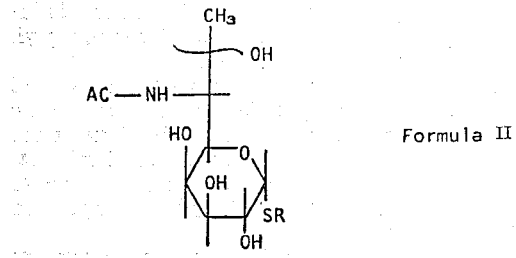

Formula II wherein R is methyl or ethyl and Ac is the acyl radical of a 4-substituted -L-2-pyrrolidinecarboxylic acid of the formula

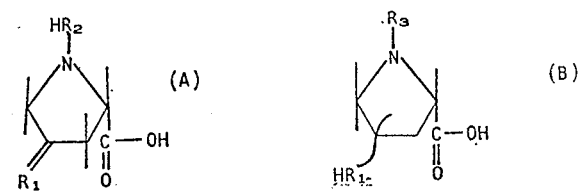

wherein $R_1$ and $R_2$ are alkylidene of not more than 8 carbon atoms (including methylene) and $R_3$ is hydrogen or $HR_2$.

The replacement is effected advantageously by mixing the starting compound of Formula II with Rydon reagent and heating. For example, when a compound of Formula II–A (Ac in Formula II is that of the acid of Formula A) is used as the starting compound, a compound here designated as Formula IA is obtained, that is a compound in which the acyl portion, equivalent to Formula B, of Formula I is replaced by an acyl portion of Formula A. When this compound (Formula I–A) or a starting compound of Formula II–A is hydrogenated with a catalyst effective to saturate an olefinic double bond, a compound of Formula I–B is obtained as a mixture of cis and trans epimers according to the formulas

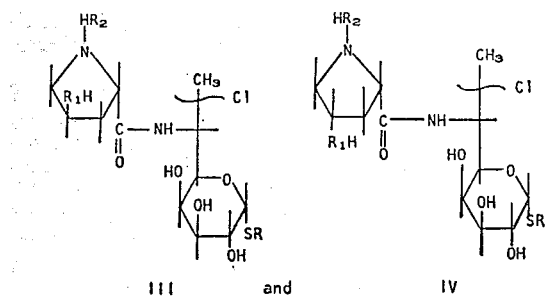

which, if desired, can be separated by counter current distribution or chromatography.

When $R_3$ in Formulas B, I–B, and II–B is hydrogen, it can be replaced by suitable alkylation or like procedure. Advantageously, this replacement is effected by reacting the compound according to Formula B, I–B, or II–B, wherein $R_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula $R_4R_5CO$ where $R_4R_5C=$ is the same as $R_2$ given above. Examples of suitable oxo compounds are formaldehyde, acetaldehyde, propionaldehyde, butyraldehyde, acetone, isobutylmethyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3 - cycopentanepropionadehyde, cyclohexaneacetaldehyde, cycloheptanecarboxaldehyde, 2,2-dimethylcyclopropylacetaldehyde, 2,2 - dimethylcyclopropyl methyl ketone, cyclopentyl methyl ketone, cyclobutyl methyl ketone, cyclobutanone, cyclohexanone, 4-methylcyclohexanone, and the like.

The starting compounds of Formula II are prepared by acylating a compound of the formula

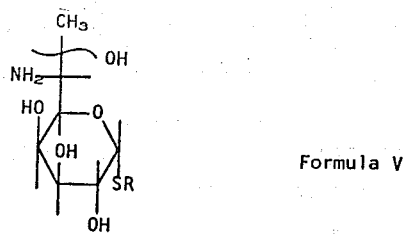

Formula V wherein R is as given above with a 4-substituted-L-2-pyrrolidinecarboxylic acid of Formula A or B. This acylation and like acylations referred to herein can be effected by procedures already well known in the art for acylating amino sugars. The starting acid of Formula A can be prepared by reacting a 4-oxo compound of the formula

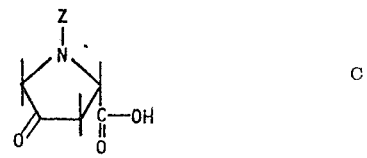

C wherein Z is a protective hydrocarbyloxycarbonyl group which is removable by hydrogenolysis, trityl, i.e., triphenylmethyl, diphenyl(p-methoxyphenyl) methyl, bis-(p-methoxyphenyl)phenylmethyl, benzyl, or p-nitrobenxyl with a Wittig agent, e.g., an alkylidenetriphenylphosphorane [see e.g., Wittig et al., Ber., 87, 1348 (1954); Trippett, Quarterly Reviews, XVII, No. 4, p. 406 (1963)]. Examples of hydrocarbyloxycarbonyl groups (Z) are tertiary-butoxycarbonyl; benzyloxycarbonyl groups of the formula

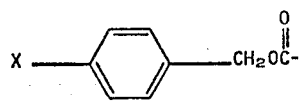

wherein X is hydrogen, nitro, methoxy, chloro, or bromo, for example, carbobenzoxy, p-nitrocarbobenzoxy, p-bromo-, and p-chlorocarbobenzoxy; and phenyloxycarbonyl groups of the formula

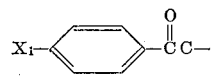

wherein $X_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

In carrying out this process the 4-oxo-L-2-pyrrolidinecarboxylic acid (Formula C) is added to a freshly prepared Wittig reagent. The Wittig reagents herein used can be generally represented by the following formula:

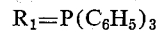

wherein $R_1$ is as given above. These Wittig reagents are prepared by reacting an alkyl, cycloalkyl, or aralkyltriphenylphosphonium halide with a base such as sodamide, or sodium or potassium hydride, or the sodium or potassium metalate of dimethylsulfoxide and the like. For example, the elimination of hydrogen halide from alkyltriphenylphosphonium halide, produces alkylidenetriphenylphosphorane. [The preparation of phosphoranes is discussed in detail by Trippett, Quart. Rev. XVII, No. 4, p. 406 (1963)]. The reaction is generally carried out in an organic solvent, such as benzene, toluene, ether, dimethylsulfoxide, tetrahydrofuran, or the like, at temperatures between 10° C. and the reflux temperature of the reaction mixture. The thus-obtained product, a 4-alkylidene-, 4-cycloalkylidene-, or 4-aralkylidene-1-protected-L-proline which has the following formula

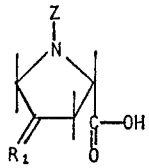

is recovered from the reaction mixture in a conventional manner, generally by extraction from aqueous solutions of the reaction mixture. The crude product can be purified by conventional means, such as recrystallization, chromatography, or formation and recrystallization of easily formed derivatives such as amine salts of the amino acid, e.g., the dicyclohexylamine salt, and the like, and liberating the amino acids from such compounds. By hydrogenating an acid of Formula D in the presence of a catalyst, e.g., platinum, which is effective to saturate a double bond, but which is ineffective to effect hydrogenolysis, a compound of the following formula

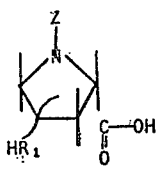

is obtained. Platinum deposited on a carrier, e.g., carbon or an anion exchange resin like Dowex-1, a cross-linked polystyrene trimethyl benzylammonium resin in the hydroxide cycle is suitable. If desired, the starting compounds of Formula II can be acylated with acids of Formula C, D, or E to form compounds II–C, II–D, and II–E, respectively. Compound II–C can then be converted to compound II–D by treatment with a Wittig reagent and compound II–D hydrogenated to compound II–E by the procedures given above. The hydrogenation, both of the acid D and the acylate II–D, gives a mixture of cis and trans epimers which, if desired, can be separated by counter current distribution or chromatography. The starting acids of Formula B in which $R_3$ is hydrogen are obtained when an acid of Formula D or E is subjected to hydrogenolysis over a palladium catalyst, e.g., palladium on carbon. Likewise, compounds of Formula II–D and II–E are converted to compounds of Formula II–B in which $R_3$ is hydrogen by the same process. The starting acids of Formula B in which $R_3$ is hydrogen as well as compounds of Formula II–B in which $R_3$ is hydrogen can be converted respectively to compounds of Formulas B and II–B in which $R_3$ is $HR_2$ by the procedures given above. The starting acids of Formula A are obtained by treating an acid of Formula D or Formula E with hydrogen bromide in acetic acid to remove the Z group and then replacing the N-hydrogen with an $HR_2$ group by the procedure given above. Compounds of Formula II–D and II–E are converted to compounds of Formula II–B by the same process.

Some of the starting compounds of Formula II are obtained biosynthetically. Lincomycin, methyl 6,8-dideoxy-6 - (trans-1-methyl-4-propyl-L-2-pyrrolidinecarboxamido) 1-thio-D-erythro-α-D-galacto-octopyranoside, is obtained as an elaboration product of a lincomycin-producing actinomycete according to U.S. Pat. 3,086,912. It has the following structural formula:

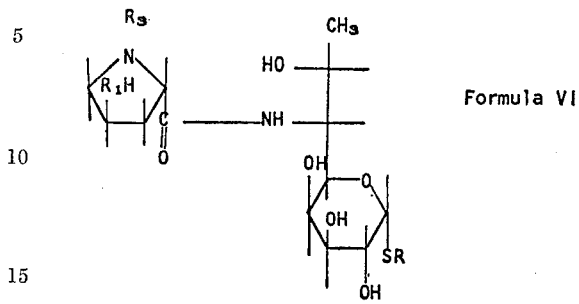

Formula VI wherein R and $R_3$ are methyl and $R_1H$ is propyl. Lincomycin B, methyl 6,8,dideoxy-6-(trans-1-methyl-4-ethyl-L - 2 - pyrrolidinecarboxamido)-1-thio-D-erythro-α-D-galacto-octopyranoside (Formula VI wherein R and $R_3$ are methyl and —$R_1H$ is ethyl) also is an elaboration product of the same microorganism when cultured according to the procedure given in U.S. Pat. 3,086,912. Lincomycin C, ethyl 6,8-dideoxy-6-(trans-1-methyl-4-propyl-L-2-pyrrolidinecarboxamido) - 1 - thio-D-erythro-α-D-galacto-octopyranoside (Formula VI wherein R is ethyl, —$R_1H$ is propyl, and $R_3$ is methyl) is obtained when the process of U.S. Pat. 3,086,912 is carried out in the presence of added ethionine. Lincomycin D, methyl 6,8-dideoxy-6-(trans - 4 - propyl-L-2-pyrrolidinecarboxamido)-1-thio-D-erythro-α-D-galacto-octopyranoside (Formula VI wherein R is methyl, —$R_1H$ is propyl, and $R_3$ is hydrogen) is obtained when the fermentation of U.S. Pat. 3,086,912 is carried out in the presence of added α-MTL, methyl 6-amino - 6,8-dideoxy-D-erythro-1-thio-α-D-galacto-octopyranoside, a compound obtained by the hydrazinolysis of lincomycin. Methyl 6,8-dideoxy-6-(trans-4-ethyl-L-2-pyrrolidinecarboxamino) - 1 - thio-D-erythro-α-D-galacto-octopyranoside (Formula VI wherein R is methyl, —$R_1H$ is ethyl and $R_3$ is hydrogen) is also produced when α-MTL is added to the fermentation of U.S. Pat. 3,086,912. Similarly, lincomycin K, ethyl 6,8-dideoxy-6(trans-4-propyl-L - 2 - pyrrolidinecarboxamido)-1-thio-D-erythro-α-D-galacto-octopyranoside (Formula VI wherein R is ethyl, —$R_1H$ is propyl, and $R_3$ is hydrogen) is produced when the fermentation of U.S. Pat. 3,086,912 is carried out in the presence of added α-ETL, ethyl 6-amino-6,8-dideoxy-D-erythro-α-thio-D-galacto-octopyranoside, a compound obtained by the hydrazinolysis of lincomycin C. Ethyl 6,8-dideoxy - 6-(trans-4-ethyl-L-2-pyrrolidinecarboxamido)-1-thio-D-erythro-α-D-galacto-octopyranoside (Formula VI wherein R is ethyl, —$R_1H$ is ethyl, and $R_3$ is hydrogen) is also obtained when α-ETL is added to the fermentation of U.S. Pat. 3,086,912. The above-described N-desmethyl products which are obtained when α-MTL and α-ETL are added to the fermentation process of U.S. Pat. 3,086,-912 are examples of starting compound II–B wherein $R_3$ is hydrogen which, by the procedure described above can have the N-hydrogens replaced when it is desired for $R_3$ to equal $HR_2$, e.g., when it is desired to produce methyl 6,8 - dideoxy-6-(trans-1-ethyl-4-propyl-L-2-pyrrolidinecarboxamido) - 1-thio-D-erythro-α-D-galacto-octopyranoside or ethyl 6,8-dideoxy-6-(trans-1-methyl-4-ethyl-L-2-pyrrolidinecarboxamido) - 1-thio-D-erythro-α-D-galacto-octopyranoside or ethyl 6,8-dideoxy-6-(trans-1-ethyl-4-ethyl-L-2-pyrrolidinecarboxamido) - 1 - thio-D-erythro-α-D-galacto-octopyranoside or methyl 6,8-dideoxy-6-(trans-1-ethyl-4-ethyl - L - 2-pyrrolidinecarboxamido)-1-thio-D-erythro-α-D-galacto-octopyranoside.

Lincomycin or any of the starting compounds of Formula II which has the D-erythro configuration can be converted to the L-threo configuration by converting the 7-hydroxy group to a 7-oxo group and then back again to a 7-hydroxy group. A suitable procedure for this purpose is illustrated in the following sequence:

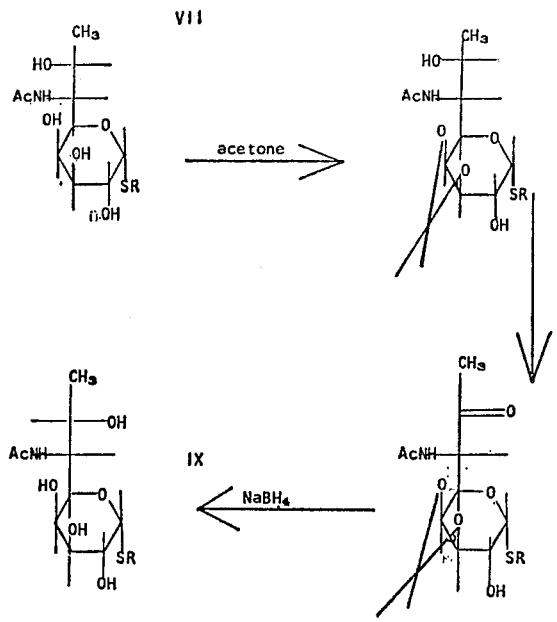

For example, lincomycin on treatment with acetone in the presence of p-toluene sulfonic acid is converted to 3,4-O-isopropylidenelincomycin which on oxidation with chromic oxide gives 7-oxo-3,4-O-isopropylidenelincomycin (methyl 6,8-dideoxy-3,-4-O-isopropylidene-6-(trans-1-methyl - 4 - propyl-L-2-pyrrolidinecarboxamido)-1-thio-D-glycero-α-galacto-octanopyranos-7-uloside which on treatment with sodium borohydride is converted to 7-epi-lincomycin (methyl 6,8-dideoxy-6-(trans-1-methyl-4-propyl - L - 2 - pyrolidinecarboxamido)-1-thio-L-threa-α-D-galacto-octopyranoside). Any of the starting compounds of Formula II having a D-erythro configuration can be converted to the corresponding L-threo configuration by this procedure.

The mechanism by which Rydon reagent effects the substitution of the 7-hydroxy by halogen is not fully understood. It is believed, however, that the mechanism is such that a change in configuration results. Thus, a 7-hydroxy compound of the D-erythro configuration would yield a 7-halo compound of the L-threo configuration.

Rydon reagents are formed by the addition of halogen to triphenylphosphine or triphenylphosphite or addition of an alkyl halide to triphenylphosphite and can be represented by the formula:

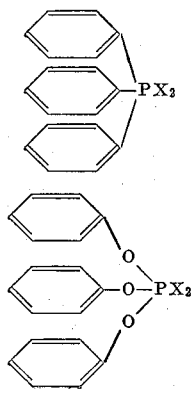

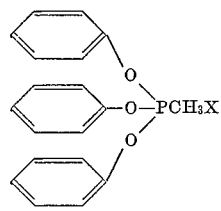

wherein X is halogen, e.g., chlorine, bromine, and iodine. Rydon et al., J. Chem. Soc., 2224 (1953); Ibid, 2281 (1954); Ibid, 3043 (1956). The Rydon reagent can be formed in situ by addition of halogen or methyl halide to a solution of the triphenylphosphine or triphenylphosphite in an inert solvent such as acetonitrile or dimethylformamide, or it can be isolated as a separate entity. In either case, the reaction with the lincomycin or related compound is effectved by contacting the Rydon reagent therewith in an inert solvent, e.g., acetonitrile or dimethylformamide, until the desired substitution of the 7-hydroxy is obtained. The reaction takes place at ordinary temperature, through gentle heating can be effected is desired. Advantageously, the temperature is maintained between about 20° C. and about 55° C. The product can be recovered from the reaction mixture by well-known techniques such as filtration, solvent extraction, etc. The reaction mixture advantageously is treated with methanol to destroy any excess Rydon reagent, filtered to remove any solid such as triphenylphosphine oxide, formed in the reaction, and then treated to recover the product. The methanol can be added either before or after the filtration. Advantageously, the treated and filtered reaction mixture is evaporated to dryness and purified by solvent extraction and/or chromatography.

The compounds of Formulas I–A, I–B, IIA, IIB, and V exist either in the protonated or non-protonated forms according to the pH of the environment. When the protonated form is intended, the compound is qualified as an acid-addition salt, and when the non-protonated form is intended, it is qualified as the free base. The free bases can be converted to stable acid-addition salts by neutralizing the free base with the appropriate pharmacologically accepted acid to below about pH 7.0, and advantageously to about pH 2 to pH 6. Suitable acids for this purpose include hydrochloric, sulfuric, phosphoric, acetic, succinic, citric, lactic, maleic, fumaric, pamoic, palmitic, glutaric, tartaric, lauric and stearic and like acids.

PREPARATION 1.—COMPOUNDS OF THE FORMULA 1

(A) 7-bromo-7-deoxylincomycin and its hydrochloride

A solution of Rydon reagent was prepared by stirring a dry solution of 52.6 g. (0.2 M) of triphenylphosphine and 800 ml. of acetonitrile at 30° C. under nitrogen and 10 ml. (0.19 M) of bromine added over a 20-min. period. After stirring for 10 minutes more, 8.2 g. of lincomycin was added and the reaction stirred at 30° C. for 18 hours. A white solid was then present. The reaction was filtered and the solid discarded. Methanol (100 ml.) was added to the filtrate and the solvents then evaporated under vacuum. The viscous residue was dissolved in 100 ml. methanol, diluted with 1800 ml. of water and extracted six times with 200 ml. portions of ether. The ether extracts were discarded, the aqueous phase made basic (pH 11) with aqueous KOH and then extracted four times with 200 ml. portions of methylene chloride. The extracts were dried and evaporated, leaving 11 g. of a yellow solid which was chromatographed over 1 kg. of silica gel using methanol:chloroform 1:9 (v./v.) as the solvent system. After a forerun of 1200 ml., 22 fractions of 56 ml. were collected. The last 6 (fractions 17–22) were pooled and evaporated to dryness yielding 2.8 g. of 7-bromo-7-deoxylincomycin. This was converted to the hydrobromide by dissolving in water, adding HBr to pH 1, filtering, and lyophilizing the filtrate. The hydrobromide had an $\alpha_D$ +114° (0.9314, H₂O) and the following analysis:

Analysis.—Calc'd for $C_{18}H_{34}Br_2N_2O_5S$ (percent): C, 39.28; H, 6.23; N, 5.09; S, 5.83; Br, 29.04. Found (percent): C, 39.64; H, 6.19; N, 5.07; S, 6.04; Br. 28.59.

In place of bromine, there can be substituted other halogens. Chlorine, for example, yields 7-chloro-7-deoxylincomycin which is identical with the product obtained by chlorinating lincomycin with thionyl chloride. In place of triphenylphosphine there can be substituted triphenyl phosphite. Also, in that case a methyl halide can be used in the place of halogen. In place of the lincomycin, there can be substituted other lincomycins and analogs thereof. Thus, when lincomycin C is substituted for lincomycin 7-bromo-7-deoxylincomycin C is obtained.

(B) Preparation of lincomycin C

Lincomycin C is obtained by reacting lincomycin with ethanthiol (ethyl mercaptan) to form a diethyl dithioacetal followed by heating in the presence of p-toluenesulfonic acid or by fusion. The following procedure is illustrative.

(B1) 6,8-dideoxy-6-(trans-1-methyl - 4 - propyl-L-2-pyrrolidine-carboxamido)-D-erythro - D-galacto-aldehydo-octose diethyl dithioacetal

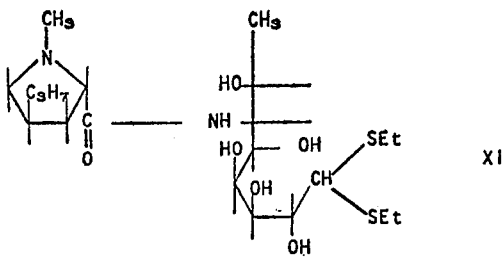

In a 1-liter, 3-necked flask were placed concentrated hydrochloric acid (150 cc.) and ethanethiol (50 cc., previously cooled to 0° C.), followed by lincomycin hydrochloride (15.0 gm.). After stirring magnetically at room temperature for 5 hours, the reaction mixture was diluted with an equal volume of ice-water, and the solution extracted thoroughly with Skellysolve B (technical hexane), these extracts being discarded.

The majority of the acid was neutralized by the careful addition of solid potassium hydroxide (100 gm.), keeping the temperature of the well-stirred reaction mixture between 20 and 30° C. by cooling in acetone-Dry Ice. Solid potassium chloride was removed by filtration, and the solid washed well with chloroform. Additional chloroform was added to the filtrate (ca. 150 cc.) and the mixture, stirred magnetically, was adjusted to pH 10 by the addition of aqueous sodium hydroxide (2 N). The chloroform layer was separated, the aqueous layer extracted thoroughly with chloroform, the combined extracts washed twice with water, and dried over anhydrous sodium sulfate. Removal of the solvent at 30° C. in vacuo gave a semi-solid residue, which on being crystallized from acetone, gave 5.41 gm. of 6,8-dideoxy-6-(trans-1-methyl-4-propyl-L-2-pyrrolidinecarboxamido)-D-erythro - D - galacto-aldehydo-octose diethyl dithioacetal as colorless flattened needles, M.P. 130-132° C. Concentration of the mother-liquors gave additional material (1.50 gm.), M.P. 129-131° C. (Total yield, 6.91 gm., 42.4%).

Analysis.—Calc'd for $C_{21}H_{42}O_6N_2S_2$ (percent): C, 52.25; H, 8.77; N, 5.81; S, 13.29. Found (percent): C, 52.38; H, 8.71; N, 5.93; S, 13.46.

(B2) Cyclization to lincomycin C (a) One part each of the diethyl dithioacetal of Part (B1) and p-toluenesulfonic acid monohydrate were refluxed in 25 parts of acetonitrile until substantial antibacterial activity was obtained. The reaction mixture was cooled and evaporated to dryness and chromatographed on silica gel using a solvent mixture ethyl acetate, acetone and water in the ratio of 8:5:1, respectively. Fractions showing antibacterial activity were pooled, evaporated to dryness, and crystallized from acetone acidified with hydrochloric acid and recrystallized by dissolving in water and adding acetone to give crystals of lincomycin C hydrochloride, M.P. 149-153° C.

(b) The diethyl dithioacetal of Part (B1) was heated to 260° C. for about 3 minutes and the odor of ethyl mercaptan was noted. The product on being chromatographed as in Part (B2)(a) yielded lincomycin C.

(C) Alternative method for preparation of lincomycin C

Lincomycin hydrochloride (8.85 g.—0.02 mole) was dissolved in 20 ml. of water, cooled at 0° C. and stirred while adding bromine (3.52 g.—0.022 mole) dropwise over a 1-minute period. Ethanethiol (25 ml.) was added and the mixture stirred at 25° C. for 2 hours. The clear, colorless, 2-phase system (ethanethiol) is relatively insoluble in water) was cooled in an ice bath and hydrogen chloride gas bubbled in for about 5 minutes. The lower, aqueous phase turned red. The reaction mixture was then extracted 3 times with 100 ml. portions of Skellysolve B and aqueous sodium hydroxide solution added to bring the aqueous phase to pH 11. The basic phase was extracted well with chloroform. The chloroform extracts were washed with saturated sodium chloride, dried, and evaporated under vacuum to yield 6.2 g. of a white solid. 4.8 g. of this solid was chromatographed over 800 g. of silica gel by art known procedures, using methanol-chloroform (1:7, respectively) as the solvent system. After 800 ml. of forerun, 80 fractions of 25 ml. each were collected. Fractions 40-58 were combined and evaporated to dryness and the residual solid recrystallized from acetone to yield 0.5 g. of material identical with the diethyl dithioacetal of Part (B1). Fractions 65-75 were combined, evaporated to dryness, and dissolved in a mixture of 5 ml. methanol and 400 ml. diethyl ether. Hydrogen chloride gas added and the white solid which precipitated was collected. On being recrystallized from aqueous acetone, 0.5 g. of lincomycin C hydrochloride was obtained.

Also, when the lincomycin is substituted by methyl 6,8-dideoxy-6-(trans - 1 - methyl- or 1-ethyl-4-butyl-L-2-pyrrolidinecarboxamido)-1-thio - D-erythro - α - D-galacto-octopyranoside the corresponding 7-bromo-7-deoxy compound, methyl 7-bromo-6,7,8-trideoxy-6-(trans-1-methyl and 1-ethyl-4-butyl - L - 2 - pyrrolidinecarboxamido)-1-thio-α-D-galacto-octopyranosides are obtained.

On substituting the cis isomers, there are obtained methyl 7-bromo-6,7,8-trideoxy-6-(cis - 1 - methyl and 1-ethyl-4-butyl-L-2-pyrrolidinecarboxamido) - 1 - thio-α-D-galacto-octopyranosides.

The cis and trans isomers used as starting materials in the above preparations were prepared as follows:

PREPARATION 2.—COMPOUNDS OF THE FORMULA (A) AND (B)

(A) 4-butylidene-1-carbobenzoxy-L-proline and the cyclohexylamine salt thereof

Sodium hydride (19 g.) as a 53% suspension in mineral oil was warmed with 350 ml. of dimethylsulfoxide at a temperature of 70–75° C. until the reaction was complete (about 30 minutes). After cooling to 32° C., 16.2 g. of butyltriphenylphosphonium bromide was added, and the resulting reaction mixture was stirred for 1 hour to insure complete reaction. A solution of 26 g. of 4-keto-1-carbobenzoxy-L-proline in 100 ml. of dimethylsulfoxide was added, and the resulting reaction mixture was heated at 70° C. for 3 hours. The reaction mixture was cooled to 25° C. and 1 liter of 2.5% aqueous potassium bicarbonate added. This mixture was washed twice with 700 ml. portions of ether and the ether was discarded after back extracting with 150 ml. of 2.5% aqueous potassium bicarbonate. The bicarbonate solutions were combined and acidified with 4 N hydrochloric acid. The acidified mixture was extracted with four 500-ml. portions of ether. The combined ether extracts were washed successively with 250 ml. of water, three 250-ml. portions of saturated aqueous sodium bisulfite, and 250 ml. of water, and dried over anhydrous sodium sulfate. Evaporation of the solvent under vacuum gave 24 g. of an oily residue which was 4-butylidene-1-carbobenzoxy-L-proline.

This residue was dissolved in 31 ml. of acetonitrile and treated with 18 ml. of dicyclohexylamine and refrigerated. The crystals were collected, washed with acetonitrile and dried in vacuo giving 21 g. (46.8%) of the crystalline dicyclohexylamine salt melting at 136–140° C. After two recrystallizations from acetonitrile, an analytical sample was obtained which melted at 142–144° C. and had a rotation of $[\alpha]_D$ −4° (c.=0.99, $CHCl_3$).

Analysis.—Calc'd. for $C_{29}H_{44}N_2O_4$ (percent): C, 71.86; H, 9.15; N, 5.78. Found (percent): C, 71.69; H, 9.30; N, 5.74.

Ten grams of the dicyclohexylamine salt of 4-butylidene-1-carbobenzoxy-L-proline was shaken with ether and excess 5% aqueous potassium hydroxide until no solid remained. The layers were separated and each one was backwashed. The aqueous alkaline layer was combined with the backwash from the ether layer and acidified with 4 N hydrochloric acid. The mixture was repeatedly extracted with ether and the ether extracts were combined, dried over sodium sulfate, and evaporated in vacuo to give 6.3 g. (93%) of 4-butylidene-1-carbobenzoxy-L-proline as an oil.

(B) butyl-1-carbobenzoxy-L-proline

The oil from Part A was hydrogenated in 200 ml. of methanol over 2.1 g. of 10% platinum on Dowex-1 catalyst under 40 lbs. hydrogen pressure. The catalyst was removed by filtration and the filtrate evaporated to yield 6.3 g. of 4-butyl-1-carbobenzoxy-L-proline as an oil. The product contained about 2 parts cis-4-butyl-1-carbobenzoxy-L-proline to each part of trans-4-butyl-1-carbobenzoxy-L-proline.

If desired, the hydrogenation of the 4-ylidene group can be postponed to any later step, even to the final step, in the process.

By substituting the butyltriphenylphosphonium bromide of Part A by another alkyltriphenylphosphonium bromide where the alkyl is methyl, ethyl, propyl, hexyl, heptyl, octyl, and the isomeric forms thereof the corresponding 4 - alkylidene-1-carbobenzoxy-L-prolines and the corresponding 4-alkyl-1-carbobenzoxy-L-prolines are obtained. For example, when the butyltriphenylphosphonium bromide is substituted by ethyl-, propyl-, isobutyl-, pentyl-, and hexyltriphenylphosphonium bromides, there are obtained 4-ethylidene-1-carbobenzoxy-L-proline,
4-propylidene-1-carbobenzoxy-L-proline,
4-isobutylidene-1-carbobenzoxy-L-proline,
4-pentylidene-1-carbobenzoxy-L-proline, and
4-hexylidene-1-carbobenzoxy-L-proline, and
cis and trans 4-ethyl-1-carbobenzoxy-L-proline,
4-propyl-1-carbobenzoxy-L-proline,
4-isobutyl-1-carbobenzoxy-L-proline,
4-pentyl-1-carbobenzoxy-L-proline, and
4-hexyl-1-carbobenzoxy-L-proline.

PREPARATION 3.—COMPOUNDS OF THE FORMULA V (A) Methyl 6-amino-6,8-dideoxy-1-thio-D-erythro-α-D-galacto-octopyranoside (α-MTL)

A solution of 40 g. of lincomycin free base (U.S. Pat. 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline α-MTL free base after drying in vacuo at room temperature was 21 g. (84%). Recrystallization was accomplished by dissolving α-MTL free base in hot dimethylformamide and adding an equal volume of ethylene glycol dimethyl ether.

Methyl 6-amino-6,8-dideoxy-1-thio-D-erythro - α - D-galacto-octopyranoside free base has a melting point of 225–228° C., an optical rotation of $[\alpha]_D^{25}$ +276° (c.=768, water) and a pKa' of 7.45.

Analysis.—Calc'd. for $C_9H_{19}NO_5S$ (percent): C, 42.7; H, 7.56; N, 5.53; S, 12.66. Found (percent): C, 42.6; H, 7.49; N, 5.75; S, 12.38.

By substituting lincomycin by lincomycin C, ethyl 6,8-dideoxy-6-(trans-1-methyl - 4 - propyl-L-2-pyrrolidinecarboxamido)-1-thio-D-erythro-α-D-galacto - octopyranoside, ethyl 6-amino-6,8-dideoxy-1-thio-D-erythro-α-D - galacto-octopyranoside is obtained.

PREPARATION 4

If desired, the procedure of Preparation 1, Part A, can be applied to the compounds of Formula V using the hydrochloride or other salt of a strong acid and the resulting 7-halo compounds processed by the ensuing steps of this example to the compounds of Formula I.

(A) Methyl 6,8-dideoxy-6-(1-carbobenzoxy-4-butyl-L-2-pyrrolidenecarboxamido) - 1 - thio - D - erythro-α-D-galacto-octopyranoside free base

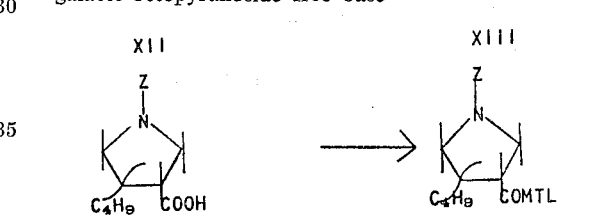

To a solution of 6.3 g. of 4-butyl-1-carbobenzoxy-L-proline (the oil from Preparation 2, Part B) in 175 ml. of distilled acetonitrile cooled to 0° C. there was added 3.46 ml. of triethylamine followed by 3.34 ml. of isobutylchloroformate. The mixture was stirred at 0° C. (±3°) for 15 minutes. A solution of 6.2 g. of α-MTL free base from Preparation 3, Part A in 85 ml. of water was added, and the reaction mixture was stirred at 0° C. for 0.5 hours and at 25° C. for 1 hour. The reaction product was then filtered and dried yielding 4.57 g. (37.7%) of methyl 6,8 - deoxy-6-(1-carbobenzoxy-4-butyl-L-2-pyrrolidinecarboxamido) - 1 - thio-Derythro-α-D-galacto-octopyranoside free base. The mother liquor was concentrated under vacuum and an additional 4.25 g. (35.2%) of product recovered. Recrystallization from acetonitrile produced crystals of methyl, 6,8-deoxy-6-(1-carbobenzoxy-4-butyl-L - 2 - pyrrolidinecarboxamido)-1-thio-D-erythro-α-D-galacto-octopyranoside free base melting at 194–196° C. A second recrystallization from acetonitrile afforded the analytical sample, M.P., 195.5–200° C., $[\alpha]_D^{25}$+111° (c.=0.98, MeOH).

Analysis.—Calcd. for $C_{26}N_{40}N_2O_8S$ (percent): C, 57.75; H, 7.46; N, 5.13; S, 5.93. Found (percent): C, 57.58; H, 7.16; N, 5.50; S, 60.7.

(B) Methyl 6,8-deoxy-6-(4-butyl-L-2-pyrrolidinecarboxamido) - 1-thio-D-erythro-α-D-galacto-octopyranoside hydrochloride

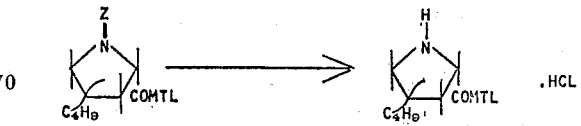

A solution of 7.8 g. of methyl 6,8-deoxy-6-(1-carbobenzoxy - 4 - butyl-L-2-pyrrolidinecarboxamido)-1-thio-D-erythro - α - D - galacto-octopyranoside free base from Part A in 200 ml. of methanol was shaken over 2 g. of 10% palladium on carbon under 40 lbs. of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated methyl 6,8 - deoxy - 6 - (4-butyl-L-2-pyrrolidinecarboxamido)-1-thio - D-erythro - α - D - galacto - octopyranoside hydrochloride which was collected by filtration and dried. The crystals, dried at 55° C. under vacuum, weighed 4.7 g. and melted at 188–194° C. The analytical sample obtained by recrystallization from acetone melted at 197–199° C. and gave $[\alpha]_D^{25}$ +150° (water, c.=0.89).

*Analysis.*—Calc'd for $C_{18}H_{34}N_2O_6S \cdot HCl$ (percent): C, 48.80; H, 7.96; N, 6.32; S, 7.24. Found (percent): (corrected for 5.54% water) C, 48.58; H, 8.19; N, 6.04; S, 7.36.

By substituting the α-MTL by ethyl 6-amino-6,8-dideoxy-1-thio-D-erythro-α-D-galacto - octanopyranoside, the corresponding ethyl 6,8-dideoxy-6-(1-carbobenzoxy-4-butyl - L - 2-pyrrolidinecarboxamido)-1-thio-D-erythro-α-D-galacto-octopyranoside is obtained.

By substituting the 4-butyl-1-carbobenzoxy-L-proline by other 4-alkyl-1-carbobenzoxy-L-prolines where the 4-alkyl is ethyl, propyl, butyl, pentyl, hexyl, heptyl, octyl, and the isomeric forms thereof, the corresponding 4-alkyl-L-2-pyrrolidinecarboxamido) - 1 - thio-D-erythro-α-D-galacto-octopyranosides are obtained. For example, by substituting the 4-butyl-1-carbobenzoxy-L-proline by 4-methyl-, 4-ethyl-, 4-propyl-, 4-pentyl-, and 4-hexyl-1-carbobenzoxy-L-proline, there are obtained methyl and ethyl, 6,8-dideoxy - 6 - (1-carbobenzoxy-4-methyl-L-2-pyrrolidinecarboxamido - 1 - thio-D-erythro-α-D-galacto-octopyranosides; methyl and ethyl, 6,8-dideoxy-6-(1-carbobenzoxy-4-ethyl - L - 2-pyrrolidinecarboxamido)-1-thio-D-erythro-α-D-galacto-octopyranosides; methyl and ethyl 6,8-dideoxy-6 - (1 - carbobenzoxy-4-propyl-L-2-pyrrolidinecarboxamido) - 1 - thio - D - erythro-α-D-galacto-octopyranosides; methyl and ethyl 6,8-dideoxy-6-(1-carbobenzoxy-4-pentyl-L - 2 - pyrrolidinecarboxamido)-1-thio-D-erythro-α-galacto-octopyranosides; methyl and ethyl 6,8-dideoxy-6-(1-carbobenzoxy - 4 - hexyl-L-2-pyrrolidinecarboxamido)-1-thio - D-erythro-α-D-galacto-octopyranosides; methyl and ethyl 6,8 - dideoxy - 6 - (4-methyl-L-2-pyrrolidinecarboxamido) - 1 - thio-D-erythro-α-D-galacto-octopyranosides; methyl and ethyl 6,8 - dideoxy-6-(4-ethyl-L-2-pyrrolidinecarboxamido) - 1-thio-D-erythro-α-D-galacto-octopyranosides; methyl and ethyl 6,8-dideoxy-6-(4-propyl-L-2-pyrrolidinecarboxamido) - 1 - thio - D - erythro-α-D-galacto-octopyranosides; methyl and ethyl 6,8-dideoxy-6-(4-pentyl - L - 2-pyrrolidinecarboxamido)-1-thio-D-erythro-α-D-galacto-octopyranosides; and methyl and ethyl 6,8-dideoxy - 6 - (4-hexyl-L-2-pyrrolidinecarboxamido)-1-thio-D-erythro-α-D-galacto-octopyranosides.

If desired, the 1-carbobenzoxy compounds prepared according to Part A can be halogenated by the procedure of Preparation 1, Part A, and the resulting 7-halo compound processed by the ensuing steps of this example to remove the 1-carbobenzoxy group and to substitute the proline nitrogen to give the final products of this example.

(C1) Methyl 6,8 - deoxy-6-(1-methyl-4-butyl-L-2-pyrrolidinecarboxamido) - 1-thio-D-erythro-α-D-galacto octopyranoside

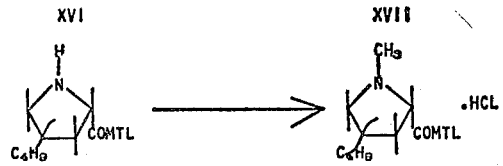

A solution of 2.0 g. of methyl 6,8-deoxy-6-(4-butyl-L-2 - pyrrolidinecarboxamido)-1-thio-D-erythro-α-D-galacto-octopyranoside hydrochloride from Part B and 2.0 ml. of 37% formalin in 150 ml. of methanol was shaken over 500 mg. of 10% palladium on carbon under 40 lbs. of hydrogen pressure for 3.5 hours. Removal of the catalyst by filtration and the solvent by distillation in vacuo yielded partially crystalline methyl 6,8-deoxy-6-(1-methyl-4 - butyl-L-2-pyrrolidinecarboxamido)-1-thio-D-erythro-α-D-galacto-octopyranoside hydrochloride which by TLC (thin layer chromatography) on silica using a mixture of ethyl acetate, acetone, water (8:4:1) for elution and $KMnO_4$ solution for detection consisted chiefly of two materials, the cis and trans isomers of methyl 6,7-deoxy-6 - (1 - methyl-4-butyl-L-2-pyrrolidinecarboxamido)-1-thio-D-erythro-α-D-galacto-octopyranoside hydrochloride in a ratio of about 3 to 2.

(C2) Separation of the cis and trans isomers by chromatography

The methyl 6,8-deoxy-6-(1-methyl-4-butyl-L-2-pyrrolidinecarboxamido) - 1 - thio-D-erythro-α-D-galacto-octopyranoside hydrochloride from Part C(1) were dissolved in a mixture of methanol and methylene chloride (1:1) and 1.5 ml. of triethylamine added. To this solution was added 7 g. of silica gel and the solvent evaporated under vacuum leaving the antibiotic deposited on the silica gel which was sifted on top of a chromatographic column of 200 grams of silica gel packed with a solvent mixture consisting of ethyl acetate, acetone, water in a ratio of 8:4:1. The column was developed by eluting with the same solvent and 20 ml. portions were collected. TLC of each fraction showed that fractions 31–38, 310 mg., were essentially pure trans isomer and that fractions 49–74, 32 mg., were essentially pure cis isomer. Fractions 39–48 consisted of a mixture of isomers which could be further separated by repeated chromatography. Each isomer was dissolved in a few drops of dilute hydrochloric acid and the hydrochloride precipitated by addition of acetone. In this manner, there was obtained 50 mg. of methyl 6,8-deoxy-6 - (trans-1-methyl-4-butyl-L-2-pyrrolidinecarboxamido) - 1 - thio-D-erythro-α-D-galacto-octopyranoside hydrochloride, M.P. 135–137° C., and about 150 mg. of methyl 6,8-deoxy - 6 - (cis-1-methyl-4-butyl-L-2-pyrrolidinecarboxamido - 1 - thio-D-erythro-α-D-galacto-octopyranoside hydrochloride, softening at 105° C. with further melting at 175–185° C.

The trans isomer recrystallized from the same solvent melted at 139–141° C. and had the following analysis:

*Analysis.*—Calc'd for $C_{19}H_{36}N_2O_6S \cdot HCl$ (percent): C, 49.93; H, 8.16; N, 6.13; S, 7.02. Found (percent): (Corrected for 4.07% $H_2O$); C, 48.81; H, 8.54; N, 6.49; S, 6.67.

Similarly recrystallization of the cis isomer gave a product softening at 108° C. and further at about 189° C. (solvated) with the following analysis:

*Analysis.*—Found: (Corrected for 4.95% water); C, 50.27; H, 9.00; N, 6.05; S, 6.65.

(D1) Methyl 6,8-deoxy-6-(1-ethyl-4-butyl-L - 2 - pyrrolidinecarboxamido) - 1 - thio-D-erythro-α-D-galacto-octopyranoside hydrochloride A mixture of 2.0 g. of methyl 6,8-deoxy-6-(4-butyl-L-2 - pyrrolidinecarboxamido)-1-thio-D-erythro-α-D-galacto-octopyranoside hydrochloride from Preparation 4, Part B, 1.5 ml. of acetaldehyde, 150 mg. of 10% palladium on carbon in 150 ml. of methanol was shaken under 35 lbs. of hydrogen pressure for 5.5 hours. The catalyst was removed by filtration to give a residue consisting chiefly of the cis and trans isomers of methyl 6,8-deoxy-6-(1-ethyl-4-butyl-L-2-pyrrolidinecarboxamido) - 1 - thio-D-erythro-α-D-galacto-octopyranoside hydrochloride.

(D2) Separation of isomers

As described in Part C(2), the mixture of isomers of Part D(1), (2 g.) was chromatographed over 200 g. of silica gel using for elution a solvent system of ethyl acetate, acetone, water (8:4.1). Fractions 33–42 by TLC were pure trans-isomer and were combined, fractions 49–64 were essentially pure cis-isomer and were also combined. Fractions 43–48 were a mixture of the isomers which could be purified by rechromatography. Each isomer was dissolved in a few drops of dilute hydrochloric acid and the crystalline hydrochloride precipitated on dilution with a large volume of ether.

The crude trans-isomer fraction of 415 mg. gave 340 mg. (15.4%) of crystalline methyl 6,8-deoxy-6-(trans-1-ethyl-4-butyl-L - 2 - pyrrolidinecarboxamido)-1-thio-D-erythro-α-D-galacto-octopyranoside hydrochloride, M.P. 144–151° C. Recrystallization from dilute acetone raised the M.P. to 148–151° C.

The cis-isomer fraction of 645 mg. afforded 300 mg. (14.1%) of crystalline methyl 6,8-deoxy-6-(cis-1-ethyl-4-butyl-L-2-pyrrolidinecarboxamido) - 1 - thio-D-erythro-α-D-galacto-octopyranoside hydrochloride, M.P. 135–139° C. Recrystallization from dilute acetone gave crystals, M.P. 134–138° C.

Separation of the cis- and trans-isomers is not a necessary step as the 7-chloro derivatives of the mixture isomers are useful per se. It is desirable, however, to keep the content of trans-isomer high as this is the most active form. By carrying out the process with this in mind mixed isomeric products containing a ratio of trans- and cis-epimers of 3:1 to 1.5 can readily be obtained. By substituting the formaldehyde and acetaldehyde of Parts C and D by other oxo compounds of the formula $R_4R_5CO$, for example, propionaldehyde, acetone, butyraldehyde, valeraldehyde, caproic aldehyde and isobutyl methyl ketone, and using the appropriate alkyl, 6,8-dideoxy-6-(4-alkyl-L - 2 - pyrrolidinecarboxamido) - 1 - thio-D-erythro-α-D-galacto-octopyranoside, there are obtained the corresponding alkyl, 6,8-dideoxy - 6 - (1-$R_4R_5$CH-4-alkyl-L-2-pyrrolidinecarboxamido) - 1 - thio-D-erythro-α-D-galacto-octopyranoside which on treatment with Rydon reagent by the procedure of Preparation I, Part A, gives the corresponding alkyl-7-halo-6,7,8-trideoxy-6-(1-$R_4R_5$CH-4-alkyl-L-2-pyrrolidinecarboxamido) - 1 - thio-α-D-galacto-octopyranoside where $R_4R_5$CH— is propyl, isopropyl, butyl, and 4-methyl-2-pentyl.

PREPARATION 5

By substituting the lincomycin by epilincomycin, there is obtained methyl 7-bromo-6,7,8-trideoxy-6-(trans-1-methyl-4-propyl-L - 2 - pyrrolidinecarboxamido)-1-thio-α-octopyranoside (7-bromo-7-deoxy-epilincomycin). The epilincomycin is prepared according to the following.

(A) 3,4-O-isopropylidene lincomycin

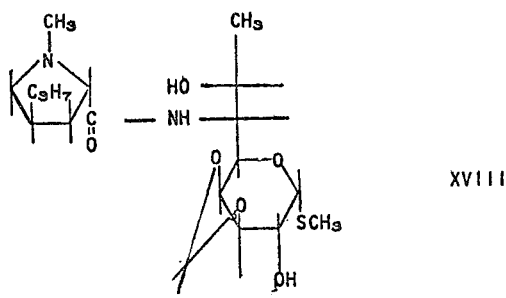

XVIII

A solution of 9.8 g. of lincomycin in 150 ml. of acetone is added to a solution of 9.8 g. of p-toluenesulfonic acid monohydrate in 100 ml. of acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid is dried in vacuo at 50° C.; yield 13.35 g. (85.5%) of 3,4-O-isopropylidenelincomycin p-toluenesulfonate. An additional 1.15 g. (7.4%) can be recovered from the mother liquors by adding 350 ml. of anhydrous ether to the mother liquor from the previous filtering operation and chilling the solution for 1 hour. The 14.5 g. so obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum, leaving 7.9 g. (73.1%) of 3,4-O-isopropylidene lincomycin which is dissolved in 25 ml. of ether acetate and concentrated to about 10 to 15 ml. The concentrate is allowed to stand at room temperature for several hours, and then refrigerated overnight. The crystals are filtered from the solution and washed sparingly with cold ethyl acetate; yield 4.55 g. (42.2%) of 3,4-O-isopropylidenelincomycin having a melting point of 126–128° C., and an optical rotation of $[\alpha]_D^{25}$ +101–102° (c., 1, methylene chloride).

(B) 7-dehydro-3,4-O-isopropylidenelincomycin

To a solution of 6 g. (0.0135 mole) of isopropylidenelincomycin in 75 ml. of pyridine was added 12 g. (excess) chromic oxide. The solution warms up about 20° C. After one hour the mixture was added to a solution containing 250 ml. each of ethyl ether and ethyl acetate. This was then filtered and evaporated to a syrup, 8.4 g. This syrup was distributed in a 500-transfer countercurrent distribution using the system, water:ethyl acetate:ethanol:cyclohexane (1:1:1:1). 7-dehydro-3,4-O-isopropylidenelincomycin was isolated as the peak fraction from tubes 330–380, K=2.45.

Analysis.—Calc'd for $C_{31}H_{36}N_2O_6S$ (percent): C, 56.72; H, 8.16; N, 6.30; S, 7.21. Found (percent): C, 56.37; H, 7.62; N, 6.51; S, 6.84.

(C) 3,4-O-isopropylidene-epilincomycin

To 1.6 g. of Craig-pure 7-dehydro-3,4-O-isopropylidenelincomycin in 75 ml. of methanol was added 400 mg. of sodium borohydride. After 1.5 hr. this solution was evaporated to dryness on a rotary evaporator. The residue was added to 25 ml. of water and extracted three times with 25 ml. each of methylene chloride. The extract was back-washed with 15 ml. of water, then dried over magnesium chloride and evaporated to dryness. The residue, 1.4 g., was distributed in a 500-transfer countercurrent distribution using the solvent system, water:ethyl acetate:ethanol:cyclohexane (1:1:1:1), and a single peak which fit the theoretical was observed at K=1.05. The material in tubes 240 to 280 was isolated as a syrup.

Analysis.—Calc'd for $C_{21}H_{38}N_2O_6S$ (percent): C, 56.47; H, 8.58; N, 6.27; S, 7.18. Found (percent): C, 56.24; H, 8.54; N, 6.13; S, 7.01.

Thin layer chromatography (TLC) showed that this material consisted of two substances. One was 3,4-O-isopropylidenelincomycin; the other 3,4-O-isopropylidene-epilincomycin, which moved slightly slower.

(D) Epilincomycin

The syrup from Part C was stored at room temperature 5 hours in a solution containing 60 ml. of 0.25 N hydrochloric acid and 40 ml. of ethanol. It was then kept at 0° C. for 4 days. Following neutralization with sodium bicarbonate, it was evaporated to 25 ml., then extracted with chloroform. The extract was washed with a little water and dried over magnesium sulfate, then evaporated to a residue. Thin layer chromatography of the residue showed two substances, both of which were active against S. lutea. The residue was chromatographed on a 14″ x ¾″ Florisil (a synthetic silicate of the type described in U.S.

Pat. 2,393,625) column which was eluted gradiently with solvent which varied continuously from 100% Skellysolve B (technical hexane) to 100% acetone. The total volume was 5000 ml. The two compounds were thus separated:

Fraction I: Tubes 53–65 (40 ml. cuts). Epilincomycin. Assay 450 mcg./ml.

*Analysis.*—Calc'd for $C_{18}H_{34}N_2O_6S$ (percent): C, 50.92; H, 8.55; N, 6.60; S, 7.56. Found (percent): C, 50.19; H, 7.91; N, 6.05; S, 6.42.

Fraction II: Tubes 73–104. Lincomycin. Assay 950 mcg./ml.

(E) 7-bromo-7-deoxyepilincomycin

The procedure of Preparation 1 substituting the lincomycin by epilincomycin yields 7-bromo-7-deoxyepilincomycin of the formula

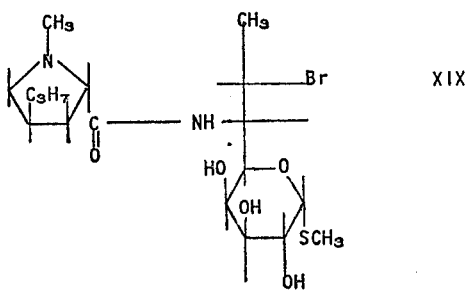

as the free base and as the hydrochloride.

By substituting lincomycin by lincomycin analogs, the corresponding 7-halo-7-deoxyepilincomycin analogs are obtained. The compounds that have been described above, therefore, have their counterpart in the opposite configuration, that is configuration derived from the 7-epi form. If an inversion is effected by the substitution of the 7-hydroxy by a Rydon reagent, then the epi-compounds, which have the L-threo configuration, are converted to the D-erythro configuration. In any event, either the D-erythro or L-threo forms are obtained, depending on whether the normal lincomycins (D-erythro) or the epi-lincomycins (L-threo) are used.

The compositions of the present invention are preferably presented for administration to humans and animals in unit dosage forms, such as tablets, capsules, pills, powders, granules, sterile parenteral solutions or suspensions, and oral solutions or suspensions, and oil-water emulsions containing suitable quantities of a compound of the Formula I in the form of the free base, or its pharmacologically acceptable salts.

For oral administration, either solid or fluid unit dosage forms can be prepared. For preparing solid compositions such as tablets, the principal active ingredient is mixed with conventional ingredients such as talc, magnesium stearate, dicalcium phosphate, magnesium aluminum silicate, calcium sulfate, starch, lactose, acacia, methylcellulose, and functionally similar materials as pharmaceutical diluents or carriers. The tablets can be laminated or otherwise compounded to provide a dosage form affording the advantage of prolonged or delayed action or predetermined successive action of the enclosed medication. For example, the tablet can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixture of polymeric acids with such materials as shellac, cetyl alcohol, cellulose acetate phthalate, styrene maleic acid copolymer and the like. Alternatively, the two component system can be utilized for preparing tablets containing two or more incompatible active ingredients. Wafers are prepared in the same manner as tablets, differing only in shape and the inclusion of sucrose or other sweetener and flavor. In their simplest embodiment, capsules, like tablets, are prepared by mixing the compound of the formulation with an inert pharmaceutical diluent and filling the mixture into a hard gelatin capsule of appropriate size. In another embodiment, capsules are prepared by filling hard gelatin capsules with polymeric acid coated beads containing the compound of the Formula I. Soft gelatin capsules are prepared by machine encapsulation of a slurry of the compound of the Formula I with an acceptable vegetable oil, light liquid petrolatum or other inert oil.

Fluid unit dosage forms for oral administration such as syrups, elixirs, and suspensions can be prepared. The water-soluble forms of the compound of the Formula I can be dissolved in an aqueous vehicle together with sugar, aromatic flavoring agents and preservatives to form a syrup. An elixir is prepared by using a hydro-alcoholic (ethanol) vehicle with suitable sweeteners such as sucrose together with an aromatic flavoring agent. Suspensions can be prepared of the insoluble forms with a syrup vehicle with the aid of a suspending agent such as acacia, tragacanth, methylcellulose and the like.

Topical ointments can be prepared by dispersing a compound of the Formula I in a suitable ointment base such as petrolatum, lanolin, polyethylene glycols, mixtures thereof, and the like. Advantageously, the compound is finely divided by means of a colloid mill utilizing light liquid petrolatum as a levigating agent prior to dispersing in the ointment base. Topical creams and lotions are prepared by dispersing the compound in the oil phase prior to the emulsification of the oil phase in water.

For parenteral administration, fluid unit dosage forms are prepared utilizing a compound of the Formula I and a sterile vehicle, water being preferred. The compound, depending on the form and concentration used, can be either suspended or dissolved in the vehicle. In preparing solutions, a water-soluble form of the compound of Formula I can be dissolved in water for injection and filter sterilized before filling into a suitable vial or ampul and sealing. Advantageously adjuvants such as a local anesthetic, preservative and buffering agents can be dissolved in the vehicle. To enhance the stability, the composition can be frozen after filling into the vial and the water removed under vacuum. The dry lyophilized powder is then sealed in the vial and an accompanying vial of water for injection is supplied to reconstitute the powder prior to use. Parenteral suspensions are prepared in substantially the same manner except that the compound is suspended in the vehicle instead of being dissolved and sterilization cannot be accomplished by filtration. The compound can be sterilized by exposure to ethylene oxide before suspending the sterile vehicle. Advantageously, a surfactant or wetting agent is included in the composition to facilitate uniform distribution of the compound.

The term unit dosage form as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such an active material for therapeutic use in humans and animals, as disclosed in detail in this specification, these being features of the present invention. Examples of suitable unit dosage forms in accord with this invention are tablets, capsules, pills, troches, suppositories, powder packets, granules, wafers, cachets, teaspoonfuls, tablespoonfuls, dropperfuls, ampuls, vials, segregated multiples of any of the foregoing, and other forms as herein described.

In addition to the administration of a compound of the Formula I as the principal active ingredient of compositions for the treatment of the conditions described herein, the said compound can be included with other types of compounds to obtain advantageous combinations of properties. Such combinations include a compound of the Formula I with antibiotics such as spectinomycin, chloramphenicol, novobiocin, dihydronovobiocin, tetracyclines (e.g., tetracycline, oxytetracycline and chlortetracycline), penicillins, erythromycin, kanamycin, streptomycin, neomycin, polymyxin, bacitracin, nystatin, filipin, fumagillin and endomycin to broaden the bacterial spectrum of the composition and for synergistic action against particular bacteria; steroids having anti-inflammatory activity such as hydrocortisone, prednisolone, 6α-methylprednisolone, 6α-fluoroprednisolone and the like; analgesics such as aspirin, sodium salicylate (acetylsalicylic acid)-anhydride, N-acetyl-p-aminophenyl and salicylamide; antihistamines, such as chlorpheniramine maleate, diphenylhydramine, promethazine, pyrathiazine, and the like; sulfas, such as sulfadiazine, sulfamethazine, sulfamerazine sulfacetamide, sulfadimethyloxazole, sulfamethizole, and the like; antifungals, such as undecylenic acid, sodium propionate, salicylanilide, sodium caprylate, and hexetidine; and the vitamins.

The dosage of a compound of the Formula I for treatment depends on route of administration; the age, weight, and condition of the patient; and the particular disease to be treated. A dosage schedule of from about 15 to 500 mg., 1 to 4 times daily (every six hours), embraces the effective range for the treatment of most conditions for which the compositions are effective. For children, the dosage is calculated on the basis of 15 to 30 mg./kg./day to be administered every six hours.

The compound of the Formula I is compounded with a suitable pharmaceutical carrier in unit dosage form for convenient and effective administration. In the preferred embodiments of this invention, the dosage units contain the compounds in: 15, 30, 50, 125, 250 and 500 mg. amounts for systemic treatment; in 0.25, 0.5, 1, 2 and 5% amounts for topical or localized treatment; and 5 to 65% w./v. for parenteral treatment. The dosage of compositions containing the compound of the Formula I and one or more other active ingredients is to be determined with reference to the usual dosage of each such ingredient.

The following examples are illustrative of the best mode contemplated by the inventors for carrying out their invention and are not to be construed as limiting.

EXAMPLE 1

Capsules

One thousand two-piece hard gelatin capsules for oral use, each containing 250 mg. of 7-chloro-7-deoxy lincomycin hydrochloride are prepared from the following types and amounts of materials:

| | Gm. |
|---|---|
| 7-chloro-7-deoxy lincomycin hydrochloride | 250 |
| Corn starch | 100 |
| Talc | 75 |
| Magnesium stearate | 25 |

The materials are thoroughly mixed and then encapsulated in the usual manner.

The foregoing capsules are useful for the systemic treatment of infection in adult humans by the oral administration of 1 capsule every 4 hours.

Using the procedure above, capsules are similarly prepared containing 7-chloro-7-deoxy lincomycin hydrochloride in 15, 30, 50, 125, and 500 mg. amounts by substituting 15, 30, 50, 125, and 500 gm. of 7-chloro-7-deoxy lincomycin hydrochloride for the 250 gm. used above.

EXAMPLE 2

Capsules

One thousand two-piece hard gelatin capsules for oral use, each containing 200 mg. of 7-chloro-7-deoxy lincomycin hydrochloride and 250 mg. of tetracycline hydrochloride, are prepared from the following types and amounts of ingredients:

| | Gm. |
|---|---|
| 7-chloro-7-deoxy lincomycin hydrochloride | 200 |
| Tetracycline hydrochloride | 250 |
| Talc | 75 |
| Magnesium stearate | 25 |

The ingredients are thoroughly mixed and then encapsulated in the usual manner.

The foregoing capsules are useful for the systemic treatment of infection in adult humans by the oral administration of 1 capsule every 6 hours.

Using the procedure above, capsules are similarly prepared containing 7-chloro-7-deoxy lincomycin hydrochloride and each of the following antibiotics in place of tetracycline by substituting 250 gm. of such other antibiotic for tetracycline: chloramphenicol, oxytetracycline, chlortetracycline, fumagillin, erythromycin, streptomycin, dihydronovobiocin and novobiocin. When a penicillin, such as potassium penicillin G, is to be used in place of tetracycline, 250,000 units per capsule is employed.

Such combination products are useful for the systemic treatment of mixed infections in adult humans by the oral administration of 1 capsule every 6 hours.

EXAMPLE 3

Tablets

One thousand tablets for oral use, each containing 500 mg. of 7-chloro-7-deoxy lincomycin hydrochloride are prepared from the following types and amounts of materials:

| | Gm. |
|---|---|
| 7-chloro-7-deoxy lincomycin hydrochloride | 500 |
| Lactose | 125 |
| Corn starch | 65 |
| Magnesium stearate | 25 |
| Light liquid petrolatum | 3 |

The ingredients are thoroughly mixed and slugged. The slugs are broken down by forcing through a number sixteen screen. The resulting granules are then compressed into tablets, each tablet containing 500 mg. of 7-chloro-7-deoxy lincomycin hydrochloride.

The foregoing tablet sare useful for systemic treatment of infections in adult humans by oral administration of 1 tablet every 4 hours.

Using the above procedure, except for reducing the amount of 7-chloro-7-deoxy lincomycin hydrochloride to 250 gm., tablets containing 250 mg. of 7-chloro-7-deoxy lincomycin hydrochloride are prepared.

EXAMPLE 4

Tablets

One thousand oral tablets, each containing 250 mg. of 7-chloro-7-deoxy lincomycin hydrochloride and a total of 250 mg. (83.3 mg. each) of sulfadiazine, sulfamerazine, and sulfamethazine, are prepared from the following types and amounts of materials:

| | Gm. |
|---|---|
| 7-chloro-7-deoxy lincomycin hydrochloride | 250 |
| Sulfadiazine | 83.3 |
| Sulfamerazine | 83.3 |
| Sulfamethazine | 83.3 |
| Lactose | 50 |
| Corn starch | 50 |
| Calcium stearate | 25 |
| Light liquid petrolatum | 5 |

The ingredients are thoroughly mixed and slugged. The slugs are broken down by forcing through a number sixteen screen. The resulting granules are then compressed into tablets, each containing 250 mg. of 7-chloro-7-deoxy lincomycin hydrochloride and a total of 250 mg. (83.3 mg. each) of sulfadiazine, sulfamerazine, and sulfamethazine.

The foregoing tablets are useful for systemic treatment of infections by the oral administration of 4 tablets first and then 1 every six hours.

For the treatment of urinary infections, the triple sulfas in the above formulation is advantageously replaced by 250 gm. of sulfamethylthiadiazole or 250 gm. of sulfacetamide.

EXAMPLE 5

Oral syrup

One thousand cc. of an aqueous suspension for oral use, containing in each 5 cc. dose, one-half gram of total sulfas and 250 mg. of 7-chloro-7-deoxy lincomycin hydrochloride is prepared from the following types and amounts of ingredients:

7-chloro-7-deoxy lincomycin hydrochloride—50 gm.
Sulfadiazine—33.3 gm.
Sulfamerazine—33.3 gm.
Sulfamethazine—33.3 gm.
Citric acid—2 gm.
Benzoic acid—1 gm.
Sucrose—700 gm.
Tragacanth—5 gm.
Lemon oil—2 cc.
Deionized water, q.s. 1000 cc.

The citric acid, benzoic acid, sucrose, tragacanth, and lemon oil are dispersed in sufficient water to make 850 cc. of solution. The 7-chloro-7-deoxy lincomycin hydrochloride and finely powdered sulfas are stirred into the syrup until uniformly distributed. Sufficient water is added to make 1000 cc.

The composition so prepared is useful in the systemic treatment of pneumonia in adult humans at a dose of 1 teaspoonful 4 times a day.

EXAMPLE 6

Parenteral solution

A sterile aqueous solution for intramuscular use, containing in 1 cc. 200 mg. of 7-chloro-7-deoxy lincomycin hydrochloride is prepared from the following types and amounts of materials:

|  | Gm. |
|---|---|
| 7-chloro-7-deoxy lincomycin hydrochloride | 200 |
| Lidocaine hydrochloride | 4 |
| Methylparaben | 2.5 |
| Propylparaben | 0.17 |
| Water for injection, q.s. 1000 cc. | |

The ingredients are dissolved in the water and the solution sterilized by filtration. The sterile solution is filled into vials and the vials sealed.

EXAMPLE 7

Parenteral preparation

A sterile aqueous solution for intramuscular use, containing in 1 cc. 200 mg. of 7-chloro-7-deoxy lincomycin hydrochloride and 400 mg. of spectinomycin sulfate, is prepared from the following types and amounts of ingredients:

|  | Gm. |
|---|---|
| 7-chloro-7-deoxy lincomycin hydrochloride | 200 |
| Spectinomycin sulfate | 400 |
| Lactose | 50 |
| Water for injection, q.s. 1000 cc. | |

The 7-chloro-7-deoxy lincomycin hydrochloride, spectomycin sulfate and lactose are dissolved in the water and the solution sterilized by filtration. The sterile solution, in the amount of 2 cc., is aseptically filled into sterile vials and frozen. The water is removed under high vacuum and the vials containing the lyophilized powder are sealed. Just prior to use, sufficient sterile water for injection to make 2 cc. of solution is added to the vial.

EXAMPLE 8

Topical ointment

One thousand gm. of 0.25% ointment is prepared from the following types and amounts of ingredients:

|  | Gm. |
|---|---|
| 7-chloro-7-deoxy lincomycin hydrochloride | 2.5 |
| Zinc oxide | 50 |
| Calamine | 50 |
| Liquid petrolatum (heavy) | 250 |
| Wool fat | 200 |
| White petrolatum, q.s. 1000 gm. | |

The white petrolatum and wool fat are melted and 100 gm. of liquid petrolatum added thereto. The 7-chloro-7-deoxy lincomycin hydrochloride zinc oxide and calamine are added to the remaining liquid petrolatum and the mixture milled until the powders are finely divided and uniformly dispersed. The powder mixture is stirred into the white petrolatum mixture and stirring continued until the ointment congeals.

The foregoing ointment is usefully applied topically to the skin of mammals for the treatment of infection.

The foregoing composition can be prepared by omitting the zinc oxide and calamine.

Following the procedure above, ointments are similarly prepared containing 7-chloro-7-deoxy lincomycin hydrochloride in 0.5, 1, 2, and 5% amounts by substituting 5, 10, 20 and 50 gm. of 7-chloro-7-deoxy lincomycin hydrochloride for the 2.5 gm. used above.

EXAMPLE 9

Cream

One thousand gm. of a vaginal cream are prepared from the following types and amounts of ingredients:

|  | Gm. |
|---|---|
| 7-chloro-7-deoxy lincomycin hydrochloride | 50 |
| Tegacid Regular [1] | 150 |
| Spermaceti | 100 |
| Propylene glycol | 50 |
| Polysorbate 80 | 5 |
| Methylparaben | 1 |
| Deionized water, q.s. 1000 gm. | |

[1] Self-emulsifying glyceryl monostearate from Goldschmidt Chemical Corporation, New York, N.Y.

The Tegacid and spermaceti are melted together at a temperature of 70–80° C. The methylparaben is dissolved in about 500 gm. of water and the propylene glycol, Polysorbate 80, and 7-chloro-7-deoxy lincomycin hydrochloride are added in turn, maintaining a temperature of 75–80° C. The methylparaben mixture is added slowly to the Tegacid and spermaceti melt, with constant stirring. The addition is continued for at least 30 minutes with continued stirring until the temperature has dropped to 40–45° C. The pH of the final cream is adjusted to 3.5 by incorporating 2.5 gm. of citric acid and 0.2 gm. of dibasic sodium phosphate dissolved in about 50 gm. of water. Finally, sufficient water is added to bring the final weight to 1000 gm. and the preparation stirred to maintain homogeneity until cooled and congealed.

The foregoing composition is useful for the treatment of vaginal infections in humans.

EXAMPLE 10

Ointment, ophthalmic

One thousand gm. of an ophthalmic ointment containing 0.5% 7-chloro-7-deoxy lincomycin hydrochloride are prepared from the following types and amounts of ingredients:

| | Gm. |
|---|---|
| 7-chloro-7-deoxy lincomycin hydrochloride | 5 |
| Bacitracin | 12.2 |
| Polymyxin B sulfate (10,000 units/mg.) | 1 |
| Light liquid petrolatum | 250 |
| Wool fat | 200 |
| White petrolatum, q.s. 1000 gm. | |

The solid ingredients are finely divided by means of an air micronizer and added to the light liquid petrolatum. The mixture is passed through a colloid mill to uniformly distribute the micronized particles. The wool fat and white petrolatum are melted together, strained, and the temperature adjusted to 45-50° C. The liquid petrolatum slurry is added and the ointment stirred until congealed. Suitably the ointment is packaged in one dram ophthalmic tubes.

The foregoing ointment is usefully applied to the eye for treatment of localized infection in humans and other animals.

Advantageously the foregoing composition can contain 5 gm. (0.5%) of methylprednisolone for the treatment of inflammation, and, alternatively, the bacitracin and polymyxin B sulfate can be omitted.

EXAMPLE 11

Eye-ear drops

One thousand cc. of a sterile aqueous solution for eye or ear use containing 10 mg. of 7-chloro-7-deoxy lincomycin and 5 mg. of methylprednisolone in each cc. is prepared from the following types and amounts of ingredients:

| | Gm. |
|---|---|
| 7-chloro-7-deoxy lincomycin hydrochloride | 10 |
| Methylprednisolone phosphate sodium | 5 |
| Sodium citrate | 4.5 |
| Sodium bisulfite | 1 |
| Polyethylene glycol 4000 | 120 |
| Myristyl-$\gamma$-picolinium chloride | 0.2 |
| Polyvinylpyrrolidone | 1 |
| Deionized water, q.s. ad 1000 cc. | |

The ingredients are dissolved in the water and the resulting solution is sterilized by filtration. The solution is aseptically filled into sterile dropper containers.

The composition so prepared is useful in the topical treatment of inflammation and infection of the eye and ear as well as other sensitive tissues of the animal body.

EXAMPLE 12

Troches

Ten thousand troches are prepared from the following types and amounts of ingredients:

| | Gm. |
|---|---|
| 7-chloro-7-deoxy lincomycin hydrochloride | 100 |
| Neomycin sulfate | 50 |
| Polymyxin B sulfate (10,000 units/mg.) | 1 |
| Ethyl aminobenzoate | 50 |
| Calcium stearate | 150 |
| Powdered sucrose, q.s. 5000 gm. | |

The powdered materials are mixed thoroughly and then compressed into half gram troches following the usual techniques for the preparation of compressed tables.

The troches are held in the mouth and allowed to dissolve slowly to provide treatment for the mouth and throat of humans.

EXAMPLE 13

Suppository, rectal

One thousand suppositories, each weighing 2.5 gm. and containing 100 mg. of 7-chloro-7-deoxy lincomycin hydrochloride are prepared from the following types and amounts of ingredients:

| | Gm. |
|---|---|
| 7-chloro-7-deoxy lincomycin hydrochloride | 100 |
| Polymyxin B sulfate (10,000 units/mg.) | 1.25 |
| Methylphednisolone | 1 |
| Ethyl aminobenzoate | 75 |
| Zinc oxide | 62.5 |
| Propylene glycol | 162.5 |
| Polyethylene glycol 4000 q.s. 2500 gm. | |

The 7-chloro-7-deoxy lincomycin hydrochloride, polymyxin B sulfate, methylprednisolone, ethyl aminobenzoate, and zinc oxide are added to the propylene glycol and the mixture milled until the powders are finely divided and uniformly dispersed. The polyethylene glycol 4000 is melted and the propylene glycol dispersion added slowly with stirring. The suspension is poured into unchilled molds at 40° C. The composition is allowed to cool and solidify and then removed from the mold and each suppository foil wrapped.

The foregoing suppositories are inserted rectally for local treatment of inflammation and infection.

Alternatively, the foregoing composition can be prepared omitting the steroid.

EXAMPLE 14

Mastitis ointment

One thousand gm. of an ointment for the treatment of mastitis in dairy cattle is prepared from the following types and amounts of ingredients:

| | Gm. |
|---|---|
| 7-chloro-7-deoxy lincomycin hydrochloride | 25 |
| Methylprednisolone acetate | 0.5 |
| Light liquid petrolatum | 300 |
| Chlorobutanol, anhydrous | 5 |
| Polysorbate 80 | 5 |
| 2% Aluminum monostearate-peanut oil gel | 400 |
| White petrolatum, q.s. 1000 gm. | |

The 7-chloro-7-deoxy lincomycin hydrochloride and methylprednisolone acetate are milled with the light liquid petrolatum until finely divided and uniformly dispersed. The chlorobutanol, polysorbate 80, peanut oil gel and white petrolatum are heated to 120° F. to form a melt and the liquid petrolatum dispersion stirred in. With continued stirring, the dispersion is allowed to cool (and congeal) to room temperature and is filled into disposable mastitis syringes in 10 gm. doses.

EXAMPLE 15

Animal feed

One thousand gm. of a feed mix is prepared from the following types and amounts of ingredients:

| | Gm. |
|---|---|
| 7-chloro-7-deoxy lincomycin hydrochloride | 10 |
| Soybean meal | 400 |
| Fish meal | 400 |
| Wheat germ oil | 50 |
| Sorghum molasses | 140 |

The ingredients are mixed together and pressed into pellets. The composition can be fed to laboratory animals, i.e., rats, mice, guinea pigs, and hamsters for prophylaxis during shipping.

For other animals such as poultry, e.g., chickens, ducks, turkeys, and geese, the composition can be added to the animal's regular feed in an amount calculated to give the desired dose of 7-chloro-7-deoxy lincomycin hydrochloride.

EXAMPLE 16

Following the procedure of each of the preceding Examples 1 through 15, inclusive, each member selected from the group consisting of methyl 7-bromo-6,7,8-trideoxy-6-(trans-1-methyl-4-propyl-L-2-pyrrolidinecarboxamido)-1-thio-D-erythro-α-D-galacto-octopyranoside (7-bromo-7-deoxylincomycin);

methyl 7-chloro-6,7,8-trideoxy-6-(trans-1-methyl-4-propyl-L-2-pyrrolidinecarboxamido)-1-thio-L-threo-α-D-galacto-octopyranoside (7 chloro-7-deoxy-7-epilincomycin);

methyl 7-bromo-6,7,8-trideoxy-6-(trans-1-methyl-4-propyl-L-2-pyrrolidinecarboxamido)-1-thio-L-threo-α-D-galacto-octopyranoside (7-bromo-7-deoxy-7-epilincomycin);

methyl 7-chloro-6,7,8-trideoxy-6-(trans-1-methyl-4-pentyl-L-2-pyrrolidinecarboxamido)-1-thio-D-erythro-α-D-galacto-octopyranoside (4'-pentyl-7-chloro-7-deoxylincomycin);

methyl 7-chloro-6,7,8-trideoxy-6-(trans-1-methyl-4-pentyl-L-2-pyrrolidinecarboxamido)-1-thio-L-threo-α-D-galacto-octopyranoside (4'-pentyl-7-chloro-7-deoxy-7-epilincomycin);

methyl 7-chloro-6,7,8-trideoxy-6-(trans-4-propyl-L-2-pyrrolidinecarboxamido)-1-thio-D-erythro-α-D-galacto-octopyranoside (N-demethyl 7-chloro-7-deoxylincomycin);

methyl 7-chloro-6,7,8-trideoxy-6-(trans-4-propyl-L-2-pyrrolidinecarboxamido)-1-thio-L-threo-α-D-galacto-octopyranoside (N-demethyl-7-chloro-7-deoxy-7-epilincomycin);

methyl 7-bromo-6,7,8-trideoxy-6-(trans-4-pentyl-L-2-pyrrolidinecarboxamido)-1-thio-D-erythro-α-D-galacto-octopyranoside (4'-pentyl-N-demethyl-7-chloro-7-deoxylincomycin);

methyl 7-chloro-6,7,8-trideoxy-6-(trans-4-pentyl-L-2-pyrrolidinecarboxamido)-1-thio-L-threo-α-D-galacto-octopyranoside (4'-pentyl-N-demethyl-7-chloro-7-deoxy-7-epilincomycin);

methyl 7-chloro-6,7,8-trideoxy-6-(trans-1-ethyl-4-pentyl-L-2-pyrrolidinecarboxamido)-1-thio-D-erythro-α-D-galacto-octopyranoside (4'-pentyl-N-ethyl-7-chloro-7-deoxylincomycin);

methyl 7-chloro-6,7,8-trideoxy-6-(trans-1-ethyl-4-pentyl-L-2-pyrrolidinecarboxamido)-1-thio-L-threo-α-D-galacto-octopyranoside (4'-pentyl-N-ethyl-7-chloro-7-deoxy-7-epilincomycin);

ethyl 7-chloro-6,7,8-trideoxy-6-(trans-1-methyl-4-propyl-L-2-pyrrolidinecarboxamido)-1-thio-D-erythro-α-D-galacto-octopyranoside (S-ethyl-7-chloro-7-deoxylincomycin);

ethyl 7-chloro-6,7,8-trideoxy-6-(trans-1-methyl-4-propyl-L-2-pyrrolidinecarboxamido)-1-thio-L-threo-α-D-galacto-octopyranoside (S-ethyl-7-chloro-7-deoxy-7-epilincomycin);

ethyl 7-chloro-6,7,8-trideoxy-6-(trans-4-pentyl-L-2-pyrrolidinecarboxamido)-1-thio-D-erythro-α-D-galacto-octopyranoside (S-ethyl-4'-pentyl-N-demethyl-7-chloro-7-deoxylincomycin);

ethyl 7-chloro-6,7,8-trideoxy-6-(trans-4-pentyl-L-2-pyrrolidenecarboxamido)-1-thio-L-threo-α-D-galacto-octopyranoside (S-ethyl-4'-pentyl-N-demethyl-7-chloro-7-deoxy-7-epilincomycin);

methyl 7-chloro-6,7,8-trideoxy-6-(cis-1-methyl-4-propyl-L-2-pyrrolidinecarboxamido)-1-thio-D-erythro-α-D-galacto-octopyranoside (Allo-7-chloro-7-deoxylincomycin);

is substituted in an equivalent amount for the 7-chloro-7-deoxy-lincomycin hydrochloride shown in the example to provide similar therapeutic properties.

Similarly, each of the above free base compounds can be used in the form of a pharmacologically acceptable acid addition salt, e.g., hydrochloride, sulfate, nitrate, phosphate, citrate, lactate, acetate, tartrate and succinate.

What is claimed is:

1. A therapeutic composition for treating humans and animals hosting a disease causing microparasite selected from the group consisting of bacteria, coccidia, and mycoplasma comprising, in unit dosage form, from about 15 to about 500 mg. of a compound of the formula:

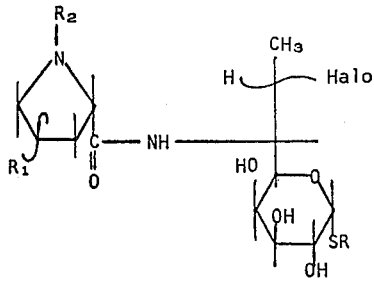

wherein Halo is chlorine or bromine, R is methyl or ethyl, $R_1$ is alkyl of from 2 to 8 carbon atoms, inclusive, and $R_2$ is hydrogen or alkyl of from 1 to 8 carbon atoms, inclusive, or the pharmacologically acceptable acid addition salts thereof as an essential active ingredient in combination with a pharmaceutical carrier.

2. The composition of claim 1 suitable for parenteral administration wherein said pharmaceutical carrier is a sterile vehicle and said compound is present in a concentrate of from about 5% to about 65% weight volume of the composition.

3. The composition of claim 1 wherein said compound is 7-chloro-7-deoxy lincomycin hydrochloride.

4. A process for treating humans and animals hosting a disease causing micro-parasite selected from the group consisting of bacteria, coccidia and mycoplasma which comprises the administering to said humans and animals a therapeutically effective amount for treating a disease causing micro-parasite selected from the group consisting of bacteria, coccidia and mycoplasma of a compound of the formula:

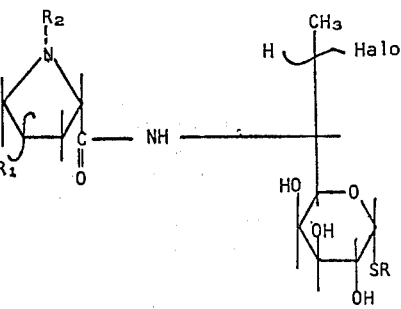

wherein Halo is chlorine or bromine, R is methyl or ethyl, $R_1$ is alkyl of from 2 to 8 carbon atoms, inclusive, and $R_2$ is hydrogen or alkyl of from 1 to 8 carbon atoms, inclusive; or the pharmacologically acceptable acid addition salts thereof in combination with a pharmaceutical carrier.

5. The process of claim 4 wherein said compound is administered in unit dosage form of from about 50 to about 500 mg. of said member.

6. The process of claim 5 wherein said compound is 7-chloro-7-deoxy lincomycin hydrochloride.

7. A process of prophylactic treatment for the prevention of a disease caused by a micro-parasite selected from the group consisting of bacteria, coccidia, and mycoplasma comprising the administering to a disease-susceptible human or animal host a prophylactic amount of a compound of the formula:

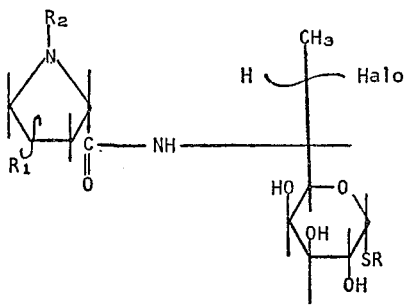

wherein Halo is chlorine or bromine, R is methyl or ethyl, $R_1$ is alkyl of from 2 to 8 carbon atoms, inclusive, and $R_3$ is hydrogen or alkyl of from 1 to 8 carbon atoms, inclusive, or the pharmacologically acceptable acid addition salts thereof in combination with a pharmaceutical carrier.

8. The process of claim 7 wherein said compound is administered in unit dosage form of from about 50 to about 500 mg.

9. The process of claim 8 wherein said compound is 7-chloro-7-deoxy lincomycin.

References Cited

UNITED STATES PATENTS

| | | | |
|---|---|---|---|
| 3,208,996 | 9/1965 | Hoeksema | 260—210 |
| 3,380,992 | 4/1968 | Argoudelis et al. | 260—210 |
| 3,418,414 | 12/1968 | Houtman | 260—210 |
| 3,435,025 | 3/1969 | Birkenmeyer | 260—210 |

ALBERT T. MEYERS, Primary Examiner

J. D. GOLDBERG, Assistant Examiner